United States Patent
Werner

[19]

[11] Patent Number: 6,068,103
[45] Date of Patent: May 30, 2000

[54] GRAIN CONVEYOR EXTENSION

[75] Inventor: Norbert E. Werner, Dodge City, Kans.

[73] Assignee: Crustbuster/Speed King, Inc., Dodge City, Kans.

[21] Appl. No.: 09/137,011

[22] Filed: Aug. 20, 1998

[51] Int. Cl.[7] .................................................. B65G 47/18
[52] U.S. Cl. ........................................ 198/311; 198/314
[58] Field of Search ................................ 198/311, 314, 198/313, 632, 579; 414/523, 504, 505

[56] References Cited

U.S. PATENT DOCUMENTS

| | | | |
|---|---|---|---|
| 3,154,189 | 10/1964 | O'Hanlon et al. | 198/91 |
| 3,547,287 | 12/1970 | Cunningham, Sr. | 214/90 |
| 3,638,816 | 2/1972 | Mann | 214/521 |
| 3,863,783 | 2/1975 | Spellman, Jr. | 214/83.26 |
| 4,446,958 | 5/1984 | Dalrymple | 198/311 |
| 4,530,429 | 7/1985 | Erickson | 198/313 |
| 4,603,775 | 8/1986 | Plett | 198/589 |
| 4,781,513 | 11/1988 | ajogren et al. | 414/489 |
| 4,924,993 | 5/1990 | Buxton | 198/311 |
| 4,963,066 | 10/1990 | Boppart | 414/376 |
| 5,184,715 | 2/1993 | Feterl | 198/667 |
| 5,234,094 | 8/1993 | Weyermann et al. | 198/303 |
| 5,305,866 | 4/1994 | Stewart et al. | 198/311 |
| 5,669,562 | 9/1997 | Smith | 241/101.74 |
| 5,718,556 | 2/1998 | Forsyth | 414/503 |

OTHER PUBLICATIONS

CMC Catalog page showing Viper conveyor Sep. 1997.
Crustbuster/Speed King brochure for Blenders, Conveyors, Elevators, Sep. 1997.
Crustbuster/Speed King flyer for Beltyor Multi–purpose loader and Slip–pit Accelerator, Fall Sep. 1997.

*Primary Examiner*—Christopher P. Ellis
*Assistant Examiner*—Rashmi Sharma
*Attorney, Agent, or Firm*—Wm. Bruce Day

[57] ABSTRACT

An extension or companion conveyor is used with a primary conveyor to convey grain or other granular materials. The companion conveyor swings into a lesser angle than the primary conveyor, which may be at a relatively steep angle to convey grain into a tall bin. The companion elevator travels at a high rate relative to the primary conveyor to provide an accelerator function. A mounting mechanism between the companion and primary conveyors includes a swing arm pivotally connected in its opposite ends so as to swing the companion conveyor from end to end abutment with the primary conveyor forwardly and outwardly to a stored/transport position parallel to the primary conveyor. A slip connection in the mounting mechanism allows the angle of the companion conveyor relative to the primary conveyor to vary as it is folded against the primary to reduce the pushing force necessary to be applied by an operator during the first half of travel of the swing arm. During initial swinging of the arm, the slip connection causes the primary to be at a higher angle relative to the primary conveyor and thereby require a higher degree of force necessary to swing the companion conveyor through its first half of travel. However, to alleviate the otherwise relatively high degree of pushing force necessary to swing the swing arm beyond the halfway point, the slip connector shifts angular relationship at approximately the half way point to lessen the force necessary.

10 Claims, 5 Drawing Sheets

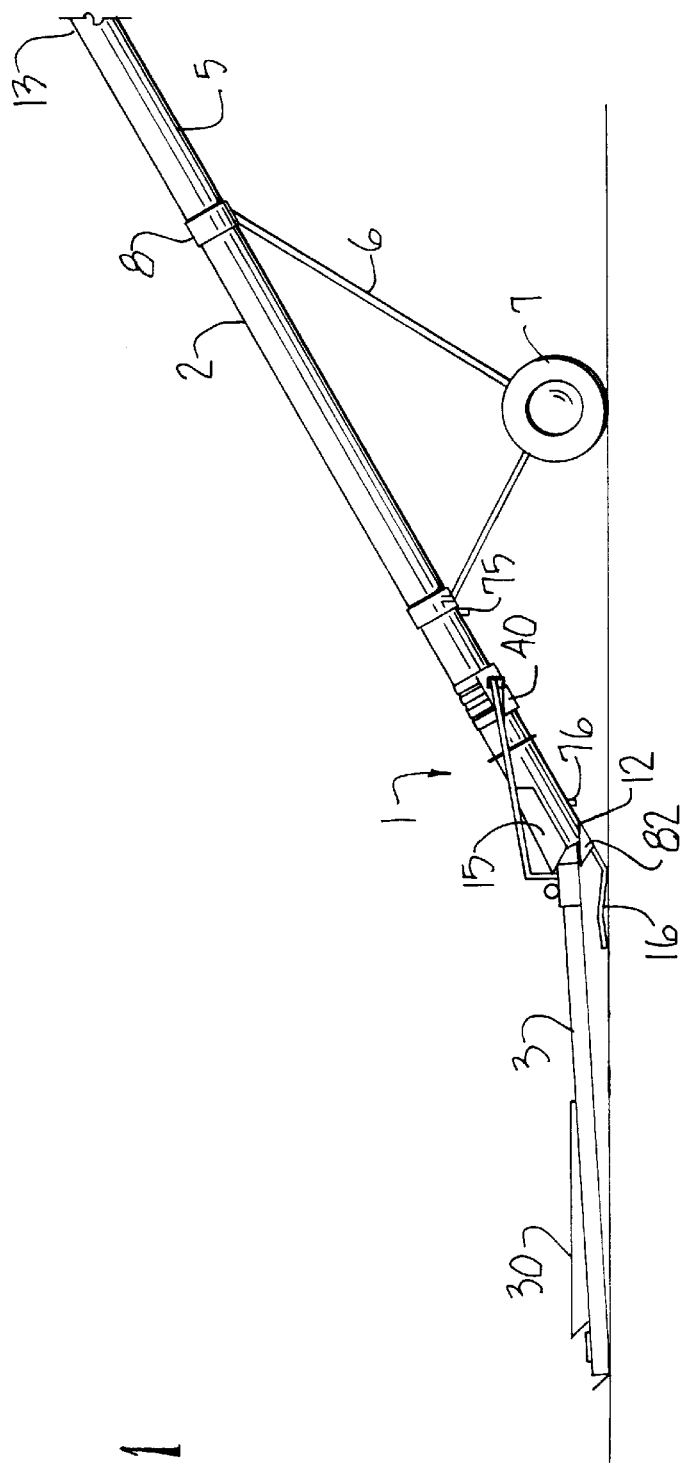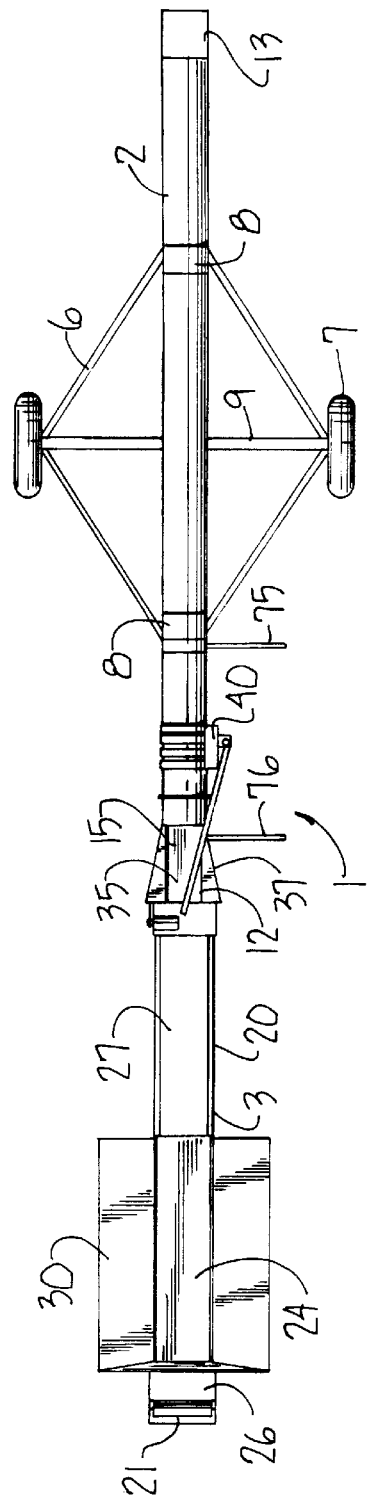

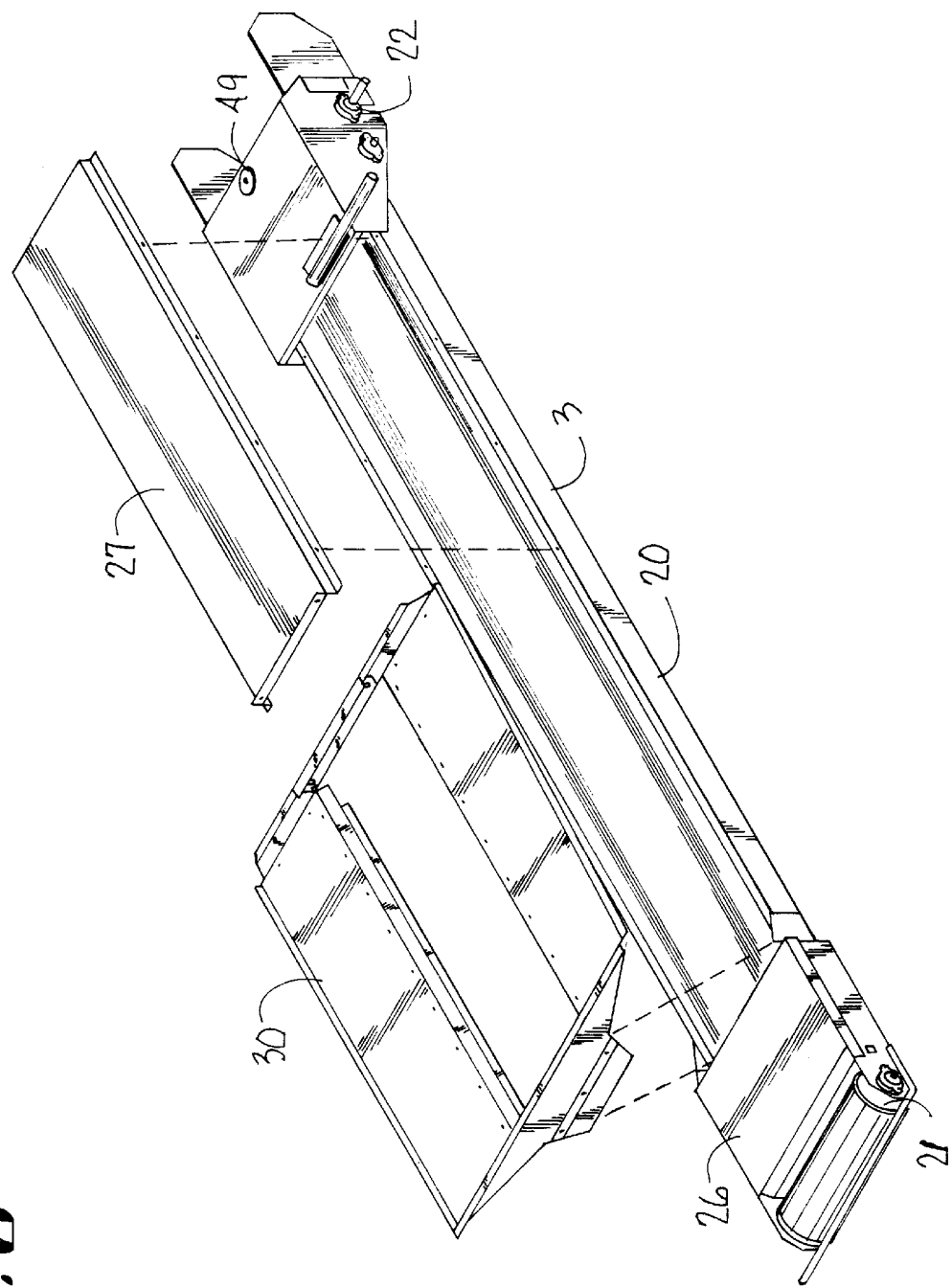

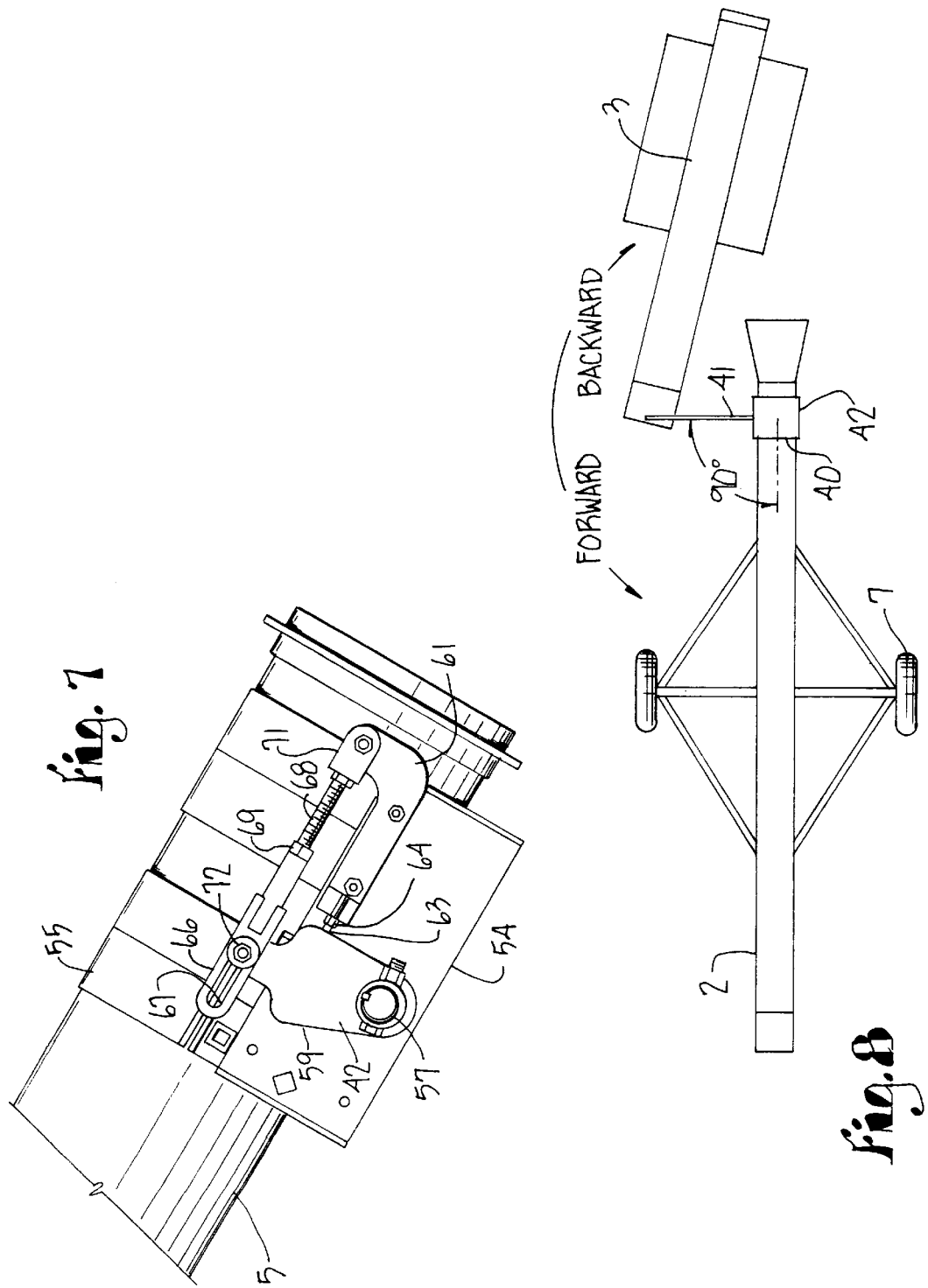

GRAIN CONVEYOR EXTENSION

FIELD OF THE INVENTION

This invention relates to extensions or companion devices to conveyors, or a two section conveyor, which is used for conveying granular material, particularly grain and other agricultural products.

BACKGROUND OF THE INVENTION

In the usual course of moving and storing grain, including wheat, corn, soy beans, oats, millet or other granular materials, harvesters work the fields and store the grain in internal hoppers until full. The harvesters contain conveyors to move the harvested grain into a truck trailer which can then be driven to a community elevator. At the community elevator, the trailer is positioned over a grate in the pavement surface and outflow doors in the bottom of the truck trailer open to flow the grain through the grates into a conveyor which then carries the grain into an elevator bin. Farm operators are increasingly turning to self storage rather than relying upon and paying the storage fees of the larger community elevator. In the farm storage situation, the grain must be unloaded from the hopper bottomed truck trailer into bins in the farmyard. As it is the rare farmyard that would have a concrete driveway area with a grate through which the grain is dumped, the grain must be received by an extension conveyor which then connects with a primary conveyor to carry the grain from the outlet of the truck trailer and into the storage bin.

Various types of extension or companion conveyors have been invented; however, many of them do not lie sufficiently flat against a ground surface to readily accept dumping of grain through the truck trailer hopper doors. Further, many companion conveyors are not handily stored and transportable with the primary conveyor. Many tend to be unwieldy in use and even more unwieldy in storage or in transport, necessitating that the companion conveyor be stored and transported separately from the primary conveyor. While this situation is acceptable for a fixed operation, when the conveyors must be moved from location to location, these machines are often unsatisfactory. Some require substantial mechanical work with tools for partial disassembly before moving.

OBJECTS OF THE INVENTION

The objects of the present invention are: To provide an improved extension or companion conveyor which lies substantially flat against the ground surface to receive grain through the bottom of hopper door trailers; to provide such a companion conveyor which folds and stores readily with the primary conveyor; without disconnecting drive belts, or major structural connections; to provide such a companion conveyor which folds flat against the primary conveyor to use minimal storage space; to provide such a companion conveyor which employs a special mechanism to allow the companion conveyor to fold easier with minimal physical effort by the operator; to provide such a companion conveyor which is easily moveable between work sites; and to provide such a companion conveyor which is economically manufactured and well suited for the intended purpose.

SUMMARY OF THE INVENTION

A companion conveyor for use of the primary conveyor used for unloading grain or materials and delivering these materials to a primary conveyor uses a conveyor of short length relative to the primary conveyor. The companion conveyor has inlet and outlet ends, a conveying means such as an auger or belt and a motor driving the conveying means at a rapid rate relative to the primary conveyor so that it is accelerated. A mounting mechanism extends between the primary and companion conveyors and includes an elongate swing arm with pivotal connections at opposite ends to the companion conveyor and the primary conveyor and enables the companion conveyor to swing forwardly and outwardly from a working position and end to end abutment with the primary conveyor to a stored/transit position parallel and adjacent to the primary conveyor. The pivotal connection with the primary conveyor generally has an axis of rotation perpendicular to the primary conveyor and includes a slip joint which changes the angle of rotation as the swing arm is rotated arcuately in order to ease the force necessary to swing the swing arm and the attached companion conveyor beyond the mid-point of the folding arc. Brackets extend from the primary conveyor to hold and support the companion conveyor parallel thereto when the companion conveyor is in the storage/transit position.

The invention will be described in more detail with the aid of an embodiment and with reference to the accompanying drawings.

BRIEF DESCRIPTION OF THE DRAWINGS

FIG. 1 illustrates a preferred embodiment of the invention and is a side elevational view of a companion conveyor connected to a primary conveyor and in an extended position.

FIG. 2 is plan view of the structure of FIG. 1.

FIG. 6 is a perspective, partially disassembled view of the companion conveyor.

FIG. 7 is an enlarged, fragmentary side elevational view of a float mechanism.

FIG. 8 is a diagrammatic view of the folding procedure.

DESCRIPTION OF EMBODIMENT

Figure 3:
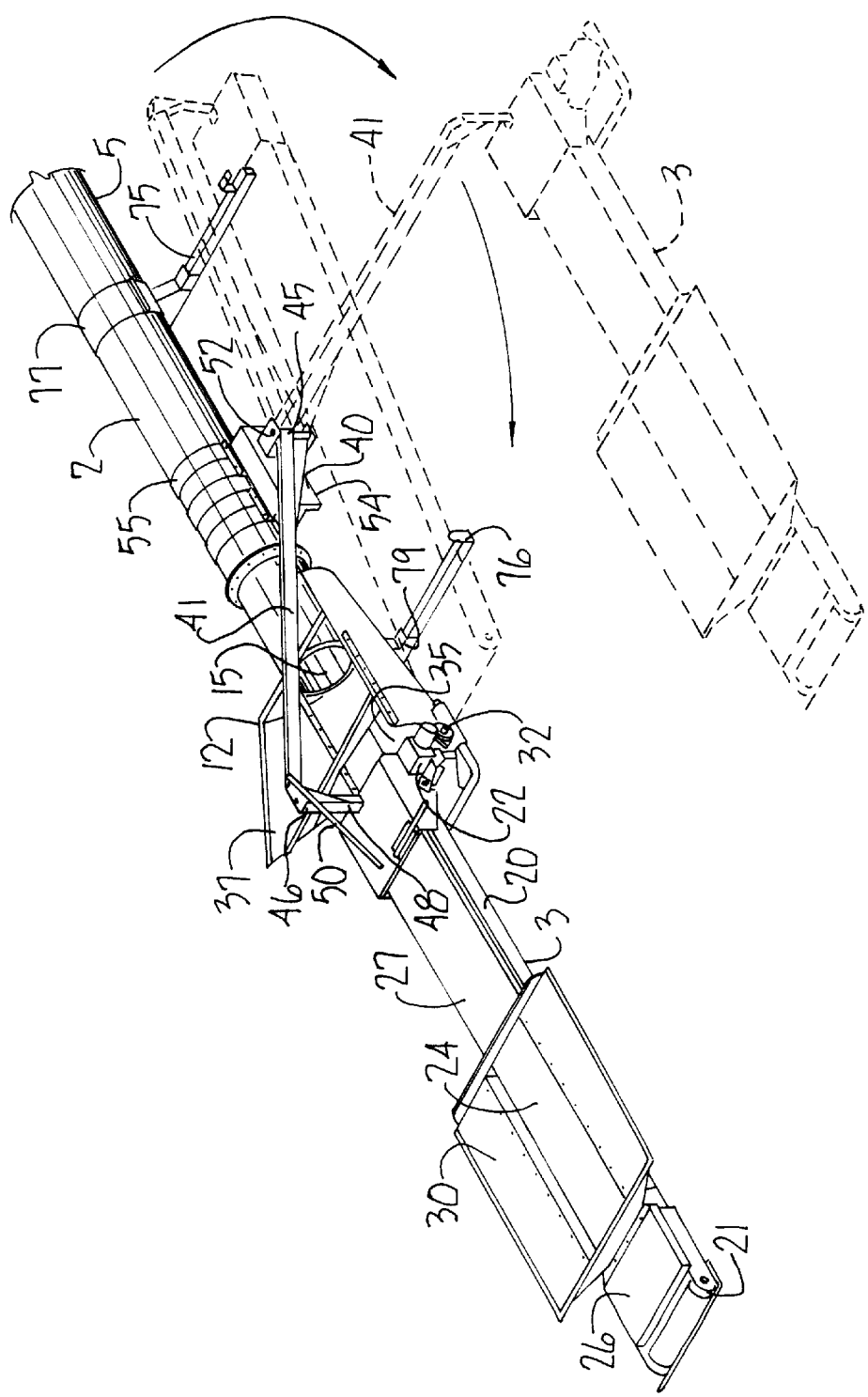
FIG. 3 is a perspective, fragmentary view of the connection between the companion conveyor and the primary conveyor.

As required, a detailed embodiment of the present invention is disclosed herein. It is, however, to be understood that the disclosed embodiment is merely illustrative of the invention, which may be embodied in various forms. Therefore, specific structural and functional details disclosed herein are not to be interpreted as limiting, but merely as providing the proper basis for the claims and as a representative basis for teaching one skilled in the arts to employ the companion conveyor.

The reference numeral 1, FIG. 1, is generally directed to a combined conveyor consisting of a primary conveyor 2 and a companion conveyor 3. Both primary and companion conveyors are previously known in the field of agricultural conveyors. The present invention is directed to the interconnection between the primary conveyor 2 and the companion conveyor 3.

In the illustrated example, the primary conveyor 2 is a belt conveyor and includes a tubular housing 5 enclosing an internal belt and mounting hardware 6 for ground engaging wheels 7. The wheel hardware 6 is preferably adjustable through use of adjustable slides 8 which can be moved to vary the angle of tilt of the primary conveyor 2. In the illustrated example, the angle is at approximately 30° which is sufficient to extend to the top of many farmstead holding bins or granaries.

The companion conveyor 3 connects with the primary conveyor 2 and extends at a much lesser angle, for example in the range of 6°, so as to reach under a grain transport vehicle, such as a truck trailer, and receive grain through bottom opening doors of the trailer. The companion conveyor 3 is able to connect to and be stowable with the primary conveyor 2 so that it can be transported along a roadway joined with the primary conveyor 2. The companion conveyor 3 is functional throughout the full range of elevational movement of the primary conveyor 2, that is, from 15° to 30° of the primary conveyor 2. The mounting hardware 6 is pivotally connected between the wheels 7 and the slides 8 so as to permit angular adjustment. An axle 9 extends between the wheels 7.

The primary conveyor 2 includes an inlet end 12 and an outlet end 13 with the inlet end 12 having an opening 15 for entry into the internal belt and receiving conveyed materials from the companion conveyor 3. The inlet end 12 also has a towing hitch 16 therewith for connection to the towing mechanism of a tractor or truck for towing the rig over roads.

The companion conveyor 3 is preferably a belt conveyor and includes a frame 20, FIG. 3, supporting a free roller 21 at one end and a drive roller and motor 22 at the other. A conveyor belt 24 is entrained about the rotors 21 and 22 to carry the grain. Front and rear guards 26 and 27 cover the belt 24. An inlet hopper 30 funnels the grain downwardly and onto the conveyor belt 24. The hopper 30 is dimensioned to fit with the bottom opening outlet of the grain transport trailer.

Like the companion conveyor 3, the primary conveyor 2 is a belt conveyor and includes a drive roller and motor 32 at the inlet end 12 which extends to a free conveyor at the outlet end 13. The conveyor belt 35 extends about the two rollers and is supported at intervals along the tubular housing 5 by free rollers (not shown). At the inlet end 12, the primary conveyor 2 includes an inlet hopper 37 which is positioned at the inlet end 12 and receives grain conveyed by the companion conveyor 3. Both the drive roller and motor 22 and drive roller and motor 32 are preferably hydraulic motors and are powered by the hydraulic pump auxiliary equipment lines from a tractor, the speed of which can be controlled to vary the speed of the motors 22 and 32. The conveyor may also be powered by the power take off (PTO) shaft of the tractor or by an electric motor.

Figure 5:
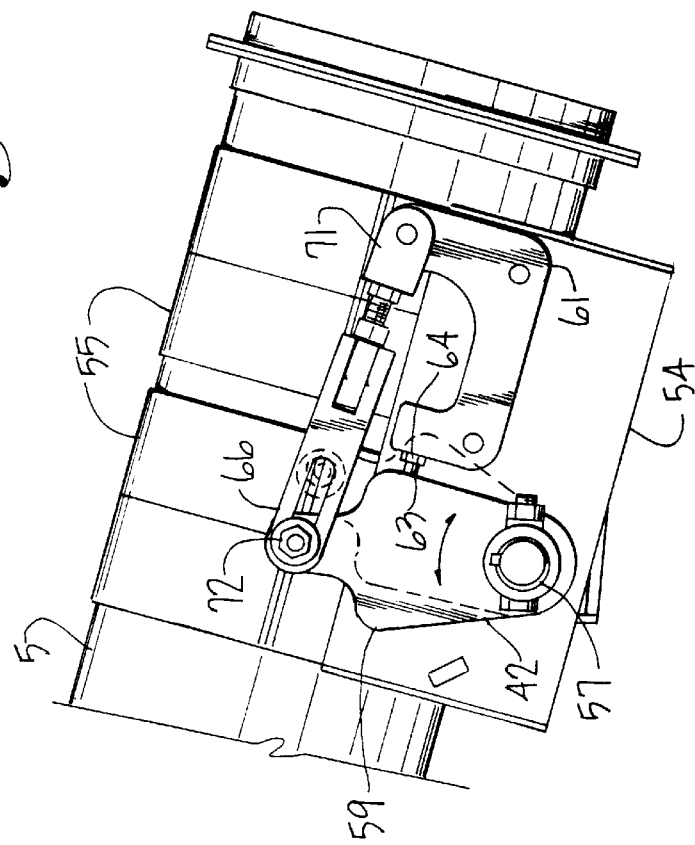
FIG. 5 is an enlarged, fragmentary side elevational view of the opposite side of the structure shown in FIG. 4.
Figure 4:
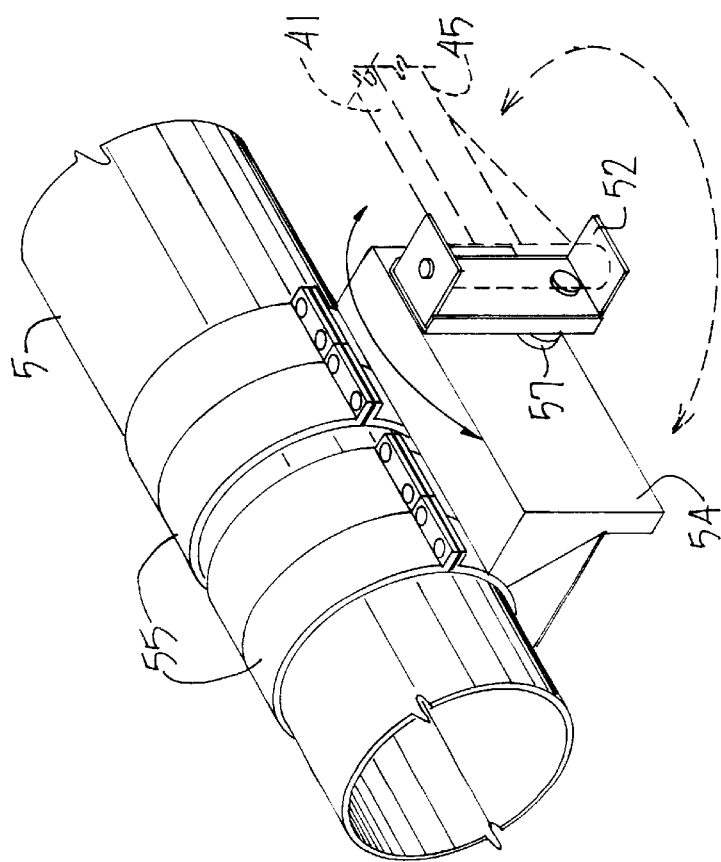
FIG. 4 is an enlarged fragmentary perspective view of the connection between the primary conveyor and the companion conveyor.

A mounting mechanism or linkage 40 extends between the primary and companion conveyors 2 and 3 are is best shown in FIGS. 3, 4 and 5. The mounting mechanism or linkage 40 includes a swing arm 41 extending between the two conveyors 2 and 3 and a float mechanism 42 opposite the swing arm attachment which permits the linkage swing arm 41 and the companion conveyor 3 to be swung outwardly and folded inwardly to position the companion conveyor 3 parallel to and against the primary conveyor 2 for transport. The float mechanism 42 significantly eases the forces required to swing the companion conveyor 3 up and against the primary conveyor 2. As can be appreciated, with up to a 30° angle of the primary conveyor 2, the pushing force required to swing the companion conveyor 3 around and against the conveyor 2 could be considerable and beyond the physical capability of a normal operator but for the mechanical aid of the float mechanism 42, the details of which will be explained below. The mounting mechanism or linkage 40, FIG. 3, includes a first end 45 pivotally connected at the primary conveyor 2 and a second end 46 pivotally connected at the companion conveyor 3. The second end 46 includes a downward extending pin 48 received into a receptacle 49, FIG. 6, at the front end of the companion conveyor 3. A handlebar 50 extends angularly outwardly from the swing arm 41 at its second end 46 at approximately a 110° angle therefrom and is used for grasping by the conveyor operator. Pushing upon the handlebar 50 provides all the leverage necessary to swing the companion conveyor free into either an extended or a stowed position. The first end 45 of the swing arm 41 is swingably connected via brackets 52 to a swing arm mount 54 which is connected via collars 55 to the tubular housing 5 and extends on both sides of the underside of the housing 5.

The bracket 52 is connected to a swing arm pivot shaft 57 which extends through the swing arm mount 54 and pivots clockwise and counterclockwise as the swing arm 41 swings between extended and stowed positions. The bracket 52 may be reversed to position the swing arm 41 on either side of the primary conveyor in order to allow for different areas of use. For example, the conveyor 1 may be positioned against a building which restricts the swinging of the companion conveyor to a different direction than the one depicted herein. Opposite the brackets 52, FIG. 4, the swing arm pivot shaft 57, FIG. 5, and FIG. 7, is first connected to a pivot lug 59 which is pinned on the shaft 57. A turnbuckle lug arm 61 is also positioned on the swing arm mount 54 adjacent the pivot lug 59 and has adjustable connections extending between the turnbuckle lug arm 61 and the pivot lug 59 which regulate clockwise and counterclockwise rotation of the pivot shaft 57 and the accompanying swing arm 41. When viewed facing, as in FIGS. 5 and 7, clockwise rotation of the pivot shaft 57 is controlled by a set screw 63 and a jam nut 64. Counterclockwise rotation of the pivot lug 59 is controlled by a turnbuckle 66 which includes an elongate slot 67, FIG. 7, an adjustment screw 68 and a jam nut 69. The back end of the turnbuckle assembly 66 is pivotally connected via a yolk 71 to the turnbuckle lug arm 61 and the front end is slidably connected to the pivot lug 59 via a pin 72. The pin 72 rides in the slot 67 as the pivot lug 59 swings left and right, FIG. 7, as the swing arm 41 is swung.

The mounting mechanism or linkage 40 permits the companion conveyor 3 to be swung from an extended position to a stowed position, FIG. 3. When in the stowed position, the companion conveyor 3 is supported on support arms formed by upper and lower carrier tubes 75 and 76. The upper carrier tube 75 is connected to the tubular housing 5 by a mount collar 77. The lower carrier tube 76 is attached to the bottom of the inlet hopper 37 through mounting brackets 79.

When the companion conveyor 3 is in the extended position, FIG. 1, the bottom of its upper end rests upon a rest 82 attached to the bottom of the inlet end 12 of the primary conveyor 2.

The swing arm 41 is adjusted using the following procedures. When the companion conveyor 3 is resting on the undercar rest 82, FIG. 1, it ensures that the pivot lug 59 is rotated back against the set screw 62, FIG. 7. At this time, the operator tests the swing arm 41 to see if it is carrying the weight of the companion conveyor 3 by checking the following: The front of the companion conveyor 3 should rest lightly upon the undercar rest 82; and the front of the companion conveyor 3 should be able to stay on its own in an indented area of the rest 82 but also be easily pulled off the rest 82 by using the swing arm handlebar 50.

If there is excessive weight on the swing arm handle 50, adjustment is accomplished by loosening the jam nut 64 and adjusting the set screw 63 until the companion conveyor weight is set as described above.

Next, the companion conveyor 3 is pulled rearwardly and off the rest 82, then the operator bounces the companion conveyor 3 somewhat to ensure all slack is out of the joints and that the pivot lug 59 is well seated against the set screw 63. When the operator is satisfied that the swing arm 41 is carrying the front end of the companion conveyor 3 at the correct setting, the set screw 63 is reset into position.

The swing arm 41 is adjusted to the proper float position. The proper amount of float is achieved when regardless of the angle of the primary conveyor 2, that is from 15° minimum to 30° maximum, the swing arm 41 can rotate to 90° of the primary conveyor, as shown in FIG. 8, and have the swing arm 41 remain in this position on its own. Too much float adjustment will cause the companion conveyor 3 to swing forwardly on its own and too little float adjustment will cause the companion conveyor 3 to run away backward or swing rearwardly on its own. The float position changes with the angle of the primary conveyor 2 and is to be adjusted or set for a given angle of elevation. To adjust, the primary conveyor 2 is elevated to the angle for which the float is to be set and the turnbuckle 66 adjusted out or in, periodically checking the companion conveyor 3 when the swing arm 41 is swung to the 90° position to determine that the companion conveyor 3 neither runs away forward or backward. The position of the turnbuckle 66 relative to the pivot lug 59 changes with the angle of the primary conveyor 2 and in FIG. 5 is shown the approximate setting for a 15° angle and in FIG. 7 is shown the approximate setting for a 30° angle. As depicted, for a 15° angle, the pin 72 is all the way forwardly in the slot 67 and for a 30° angle, the pin 72 is all the way rearwardly in the slot 67. Angles between 30° and 15° will call for the pin 72 to be positioned between the two extremes. Use of the float mechanism 42 allows ease of moving the companion conveyor 3 into and out of the stowed and extended positions relative to the primary conveyor 2 when the primary conveyor is elevated. Before the combined conveyor 1 is transported, the operator must ensure that the primary conveyor 2 is lowered to its transport height and that the turnbuckle 66 is adjusted so that the pivot lug 59 is again seated against the set screw 63.

The companion conveyor 3 is also an accelerator conveyor in that the driver and motor 22 is set to run the belt 24 at approximately 20% greater than the line speed of the conveyor belt 35 of the primary conveyor 2. Tests have shown that this speed differential increases the carrying rate of the combined conveyor by approximately 33% over the situation where the primary conveyor fed directly through a hopper and does not employ an accelerating companion conveyor.

For the preferred structure in which the principals of the present invention have been incorporated, as shown and described above, it has been understood that the invention is not to be limited to the particular details shown and described above but that widely different means may be employed in the practice of the broader aspects of this invention.

What is claimed and desired to be secured by Letters Patent is as follows:

1. A companion conveyor for use with a longer primary conveyor and used for unloading granular materials and delivering same to said primary conveyor; the companion conveyor comprising:

a) a frame of short length relative to such primary conveyor and having an inlet end with an infeed receptacle for receiving granular materials to be conveyed;

b) an outlet end for depositing said materials into an inlet end of said primary conveyor;

c) conveying means with said frame and a motor driving said conveying means;

d) a mounting mechanism extending between said primary and companion conveyors for folding said companion conveyor against said primary conveyor, and including an elongate swing arm having a second end pivotally attached to said companion conveyor at a first location adjacent said outlet end and a first end pivotally attached to said primary conveyor at a second location adjacent to the inlet end thereof so that said companion conveyor swings forwardly and outwardly from a working position in end to end abutment with said primary conveyor to a stored/transport position parallel and adjacent thereto; and e) spaced rest brackets extending outwardly from said primary conveyor to receive and hold said companion conveyor in said stored/transport position.

2. The companion conveyor set forth in claim 1 wherein said mounting mechanism includes a collar extending about said primary conveyor at a location spaced upwardly from said inlet end of said primary conveyor, said swing arm being rotatably mounted to said collar for movement from a rearward position to a forward position.

3. The companion conveyor set forth in claim 2 wherein said collar includes a threaded adjustment arm for varying the tilt of said swing arm relative to said primary conveyor as said swing arm swings from said rearward position to said forward position.

4. The companion conveyor set forth in claim 1 including a support arm extending outwardly from said primary conveyor at a location between said mounting mechanism and said inlet end of said primary conveyor, said support arm receiving said companion conveyor when rotated to said stored/transport position.

5. The companion conveyor set forth in claim 1 wherein said companion conveyor conveys at a faster rate than the rate of conveyance of said primary conveyor.

6. The companion conveyor set forth in claim 1 wherein said inlet end includes a hopper fixture for receiving said granular materials.

7. A companion conveyor for use with a longer primary conveyor used for unloading granular materials and delivering same to said primary conveyor, the companion conveyor comprising:

a) A conveyor of short length relative to said primary conveyor and having inlet and outlet ends, conveying means and a motor driving said conveying means; and b) a mounting mechanism including an elongate swing arm pivotally connected at opposite ends to said companion conveyor and to said primary conveyor and enabling said companion conveyor to swing forwardly and outwardly from a working position in end to end abutment with said primary conveyor to a stored/transport position parallel and adjacent thereto; and c) means for holding said companion conveyor against said primary conveyor in said store/transport position.

8. The companion conveyor set forth in claim 7 wherein said companion conveyor conveys at a faster rate than the rate of conveyance of said primary conveyor.

9. The companion conveyor set forth in claim 7 wherein a pivotal connection of said swing arm to said primary conveyor is tiltable to vary the axis of rotation from side to side as said swing arm is swung in an arc, whereby a person is able to exert a reduced pushing force on the swing arm to move the companion conveyor between said working position and said stored/transport position.

10. A companion conveyor for use with a primary conveyor used for unloading granular materials and delivering same to said primary conveyor, the companion conveyor comprising:

a) a conveyor of short length relative to said primary conveyor and having inlet and outlet ends, conveying means and a motor driving said conveying means at a rapid rate relative to said primary conveyor;

b) a mounting mechanism including an elongate swing arm with pivotal connections at opposite ends to said companion conveyor and said primary conveyor and enabling said companion conveyor to swing forwardly and outwardly from a working position in end to end abutment with said primary conveyor to a stored/transport position parallel and adjacent thereto, the pivotal connection with said primary conveyor generally having an axis of rotation perpendicular to said primary conveyor and including a slip joint changing the angle of rotation as said swing arm is rotated accurately to ease the force necessary to swing the swing arm and companion conveyor; and c) means for holding said companion conveyor against said primary conveyor in said stored/transport position.

* * * * *